United States Patent [19]

Hiatt et al.

[11] Patent Number: 5,530,845
[45] Date of Patent: Jun. 25, 1996

[54] STORAGE CONTROL SUBSYSTEM IMPLEMENTED WITH AN APPLICATION PROGRAM ON A COMPUTER

[75] Inventors: David M. Hiatt; Timothy R. Klos, both of St. Louis, Mo.

[73] Assignee: Southwestern Bell Technology Resources, Inc., St. Louis, Mo.

[21] Appl. No.: 373,896

[22] Filed: Jan. 17, 1995

Related U.S. Application Data

[63] Continuation of Ser. No. 882,010, May 13, 1992, abandoned.

[51] Int. Cl.⁶ ............................................... G06F 13/10
[52] U.S. Cl. ...................... 395/500; 395/882; 395/883
[58] Field of Search ............................. 395/500, 882, 395/883

[56] References Cited

U.S. PATENT DOCUMENTS

| | | |
|---|---|---|
| 3,544,969 | 12/1970 | Rakoczi et al. . |
| 4,084,235 | 4/1978 | Hirtle et al. . |
| 4,277,827 | 7/1981 | Carlson et al. . |
| 4,394,732 | 7/1983 | Swenson . |
| 4,394,733 | 7/1983 | Swenson . |
| 4,399,503 | 8/1983 | Hawley . |
| 4,415,969 | 11/1983 | Bayliss et al. . |
| 4,425,615 | 1/1984 | Swenson et al. . |
| 4,454,595 | 6/1984 | Cage . |
| 4,467,421 | 8/1984 | White . |
| 4,476,526 | 10/1984 | Dodd . |
| 4,500,933 | 2/1985 | Chan . |
| 4,511,963 | 4/1985 | Kantner . |
| 4,638,423 | 1/1987 | Ballard . |
| 4,775,969 | 10/1988 | Osterlund . |
| 4,792,896 | 12/1988 | MacLean et al. . |
| 4,803,623 | 2/1989 | Klashka et al. ....................... 395/275 |
| 4,812,975 | 3/1989 | Adachi et al. . |
| 4,855,905 | 8/1989 | Estrada et al. . |
| 4,864,291 | 9/1989 | Korpi . |
| 4,864,532 | 9/1989 | Reeve et al. . |
| 4,868,734 | 9/1989 | Idleman et al. . |
| 4,888,691 | 12/1989 | George et al. . |
| 4,888,727 | 12/1989 | Getson, Jr. et al. . |
| 4,965,801 | 10/1990 | Dulac . |
| 5,088,033 | 2/1992 | Binkley et al. . |
| 5,131,082 | 7/1992 | Bonevento et al. . |
| 5,151,985 | 9/1992 | Sander et al. . |
| 5,247,638 | 9/1993 | O'Brien et al. ........................ 395/425 |

FOREIGN PATENT DOCUMENTS 246125  3/1994  Argentina .

OTHER PUBLICATIONS

Copy of a diagram, for an adaptor to link an ECKD/byte multiplexer channel to Micro Channel.

*Primary Examiner*—Krisna Lim
*Attorney, Agent, or Firm*—Greenblum & Bernstein

[57] ABSTRACT

A storage controller is disclosed which may emulate several types of specialized host specific and/or storage device specific storage controllers. The storage controlling system can transfer information between one or more different types of target units and one or more channels of at least one host. The system is provided with a computer, which includes a first interface, a second interface, and a programmable storage controller. The first interface is configured to receive one or more channel adapters which carry one or more channel programs transmitted from the channels of the host. The channel programs may carry data, status information, and commands. The second interface allows input and output to storage facilities which comprise one or more target units. The programmable storage controller may be provided with a device coupled to the channel adapters for translating channel program commands, and determining, from the channel program, a target unit for which at least one channel program is transmitted. A set of equipment controllers is provided which interpret channel program commands and status information, and which further control data transfers to and from the storage facilities in accordance with the channel program command. A device is also provided for establishing a unit thread by choosing an equipment controller from the set of equipment controllers as a function of the type of equipment that the channel requests as a target.

48 Claims, 8 Drawing Sheets

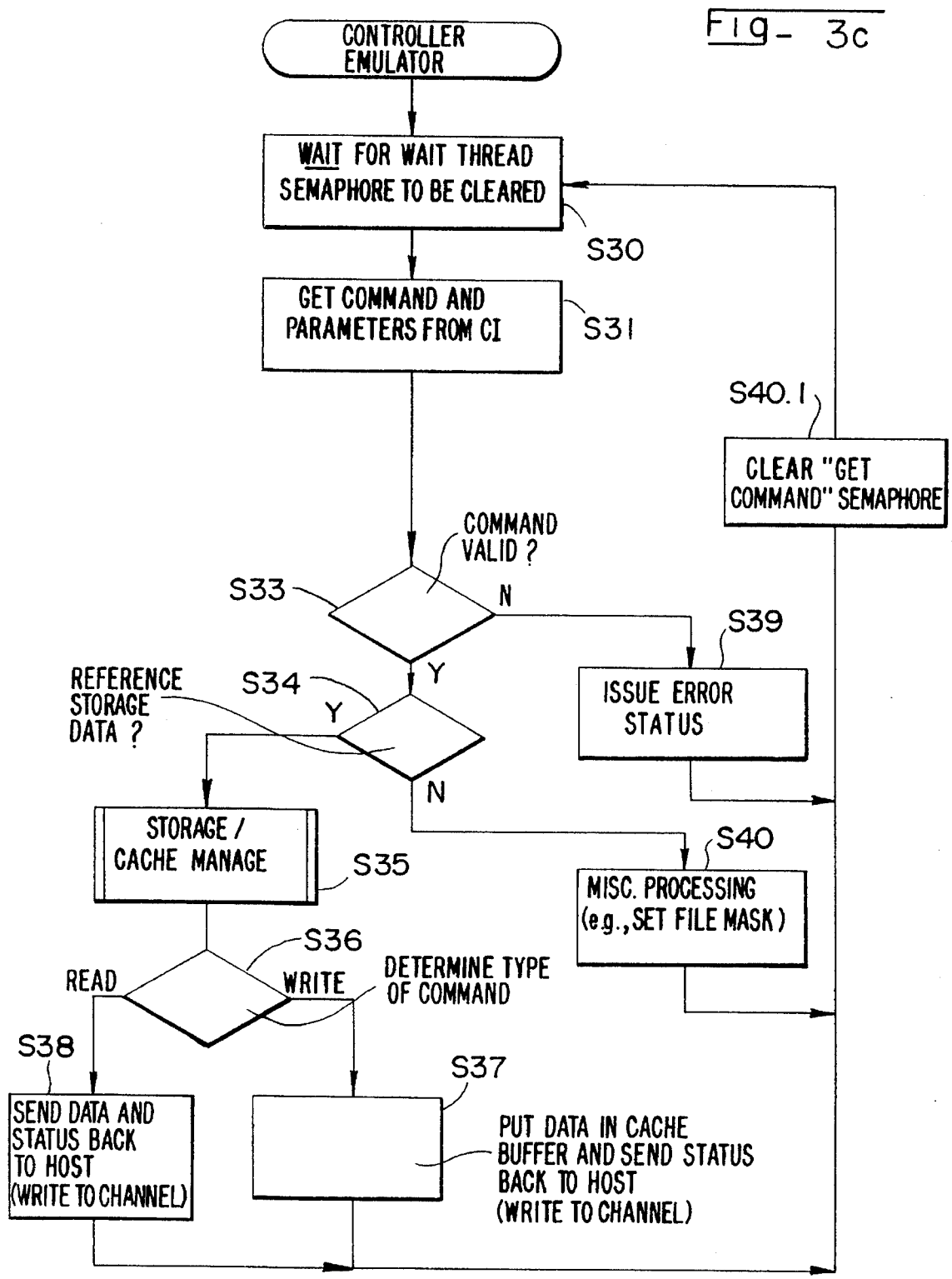

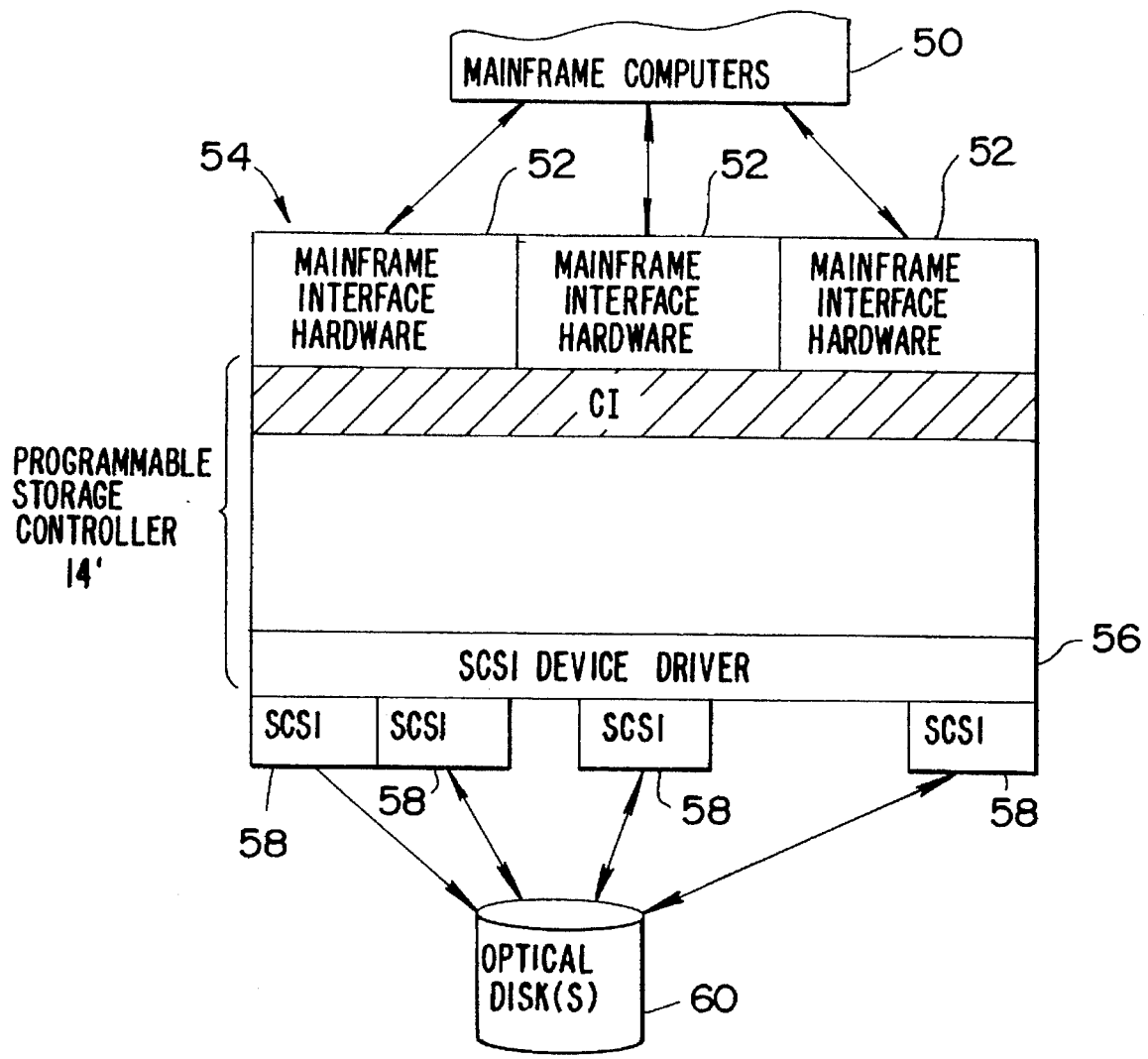

STORAGE CONTROL SUBSYSTEM IMPLEMENTED WITH AN APPLICATION PROGRAM ON A COMPUTER

This application is a continuation of application Ser. No. 07/882,010, filed May 13, 1992, now abandoned.

FIELD OF THE INVENTION

The present invention relates to a storage controller for a host computer system. More particularly, the present invention relates to a programmable storage controller implemented on a computer which is capable of emulating one or more storage device specific and/or host specific storage controllers.

DISCUSSION OF BACKGROUND INFORMATION

Mainframe computer systems, such as the IBM 3990, the IBM 4381, and the UNISYS 2200/200, send and retrieve data to and from storage facilities via storage controllers. Such mainframe computers communicate with their peripheral storage facilities, such as disk and tape systems, via one or more "channels." These channels carry commands and data between the computer and the storage facilities. The channels extend between, or "bridge" the gap between, the mainframe computer's main processor (i.e., the CPU) and the storage controller. The storage controller then interprets the commands and manipulates the storage facilities to satisfy a request.

Mini computers also communicate with storage facilities via storage controllers. Normally, storage controllers for mini computers are far less sophisticated than those for mainframe computers; however, they provide essentially the same, albeit more limited, services or functions. For example, in mini computer systems, storage controllers are typically held on a common bus, rather than on separate channels for each string of disks or other storage devices. The bus provides similar functions to that of the channel, except that only one controller on a particular bus can be active at one time. In channel architecture, which is provided on mainframe computers, all the channels may be active simultaneously. Thus, mainframe computers have much wider maximum I/O band widths than mini computers.

At the present time, due to rapid advances in peripheral technologies, newly developed storage facilities are available which have increased capabilities in areas such as efficiency and size. For example, rewritable optical disks, optical tapes, and 4 mm digital tapes (DAT) are each known for their large storage capacities, reasonably quick access time, and low floor space and power requirements. However, in order for current mainframe and mini computers to access these improved storage facilities, specialized storage controllers must be developed (or purchased) which may handle such storage facilities. For example, in order to facilitate connection of mainframe FIPS 60 channels to a SCSI storage device interface, several specialty manufacturers provide plug-in boards which allow VME base computers, such as the SUN, to intercept FIPS 60 channel inputs. However, these products have been provided by small organizations for limited specialty applications; they are not generic storage controllers which will support all or a significant portion of newly developed storage facilities.

Another significant limitation of conventional storage controllers is that they are typically limited in their ability to communicate with only the specific operating system of one host computer system. Although many mainframe channels utilize the FIPS 60 channel communication protocol, for each unique operating system (e.g., UNIX, OS/2 DOS, AIX), the channel program command set will have a unique "dialect." Thus, "host-specific" storage controllers must be provided to support each operating system.

There is a tremendous cost associated with buying or developing specialized (host specific and/or storage device specific) storage controllers. Thus, there is a need for a generalized, versatile, programmable storage controlling system which would allow various host computer systems to utilize, and thus benefit from, the increased advantages of new peripheral storage facilities that are now available, or which will be available in the near future.

SUMMARY OF THE INVENTION

In view of the above, the present invention, through one or more of its various aspects and embodiments, is thus intended to bring about one or more of the following objects and advantages.

One object of the present invention is to provide a single storage controller which may emulate several types of specialized host specific and/or storage device specific storage controllers. A further object of the present invention is to allow free substitution of storage devices, and thus provide a storage controller which will control data transfer to and from different types of both sequential and random access storage devices.

It is yet a further object of the present invention is to provide a storage controlling system which has an intercontroller communication bridge, which allows controller facilities to be shared.

Still a further object of the present invention is to provide a storage controlling system which will be capable of archiving data directly without intervention or use of the host computer system.

It is yet a further object of the present invention to integrate new peripheral storage facility technology, independently of the requirements and/or limitations of the host computer system.

It is yet a further object of the present invention to provide a storage controlling system which has customized controller services such as data compression and caching algorithms.

It is yet a further object of the present invention to provide a storage controlling system which may be utilized simultaneously by a number of host computers, wherein the host computers may have different operating systems and/or different channel communications protocols.

It is yet a further object of the present invention to substantially reduce the number of controllers required in channel architecture computers, by providing a programmable general purpose storage controlling system.

It is yet a further object of the present invention to provide a storage controlling system which has enhanced efficiency characteristics, such as dynamic data compression.

It is a further object of the present invention to provide a storage controlling system which can achieve greater storage capacities, lower costs, lower power consumption, and less use of floor space, by allowing a host computer system to be connected to a variety of newly available storage facility technologies.

The present invention, therefore, is directed to a storage controlling system for transferring information between one or more target units and one or more channels of at least one host. The host is configured for one or more types of equipment corresponding to the one or more target units. The system is provided with a computer, which includes a first interface, a second interface, and a programmable storage controller. The first interface is configured to receive one or more channel adapters which carry one or more channel programs transmitted from the one or more channels of the host. Each channel program typically carries data, status information and commands. The second interface interfaces, and thus allows input and output, to storage facilities which comprise the one or more target units. In a particular aspect, the type of equipment for which the host is configured is different than the one or more target units.

In accordance with a particular aspect of the present invention, the programmable storage controller comprises a device coupled to the one or more channel adapters for translating channel program commands and determining, from the channel program, a target unit for which at least one channel program command is transmitted. In addition, a set of equipment controllers is provided which interpret channel program commands and status information, and which control data transfer to and from the storage facilities in accordance with the channel program command. Each equipment controller is provided with a device for calling a storage control manager. In addition, a device is also provided for establishing a unit thread by choosing an equipment controller from the set of equipment controllers. Each equipment controller is chosen as a function of a type of equipment that the channel requests as a target. The programmable storage controller also includes a device for passing channel program data to the unit thread and a device for executing the unit thread by executing the chosen equipment controller.

In accordance with another aspect of the present invention, the equipment controller is further provided with a mechanism for calling a cache manager. In addition, the equipment controller may be provided with a device for prioritizing input and output to and from the storage facilities. The one or more channel adapters may comprise one or more channel interface circuits, and the first interface may be provided with a channel interface controller. In this regard, the second interface may be provided with at least one of random access and sequential storage device channel adapters.

The system may include a random access and/or sequential storage device, wherein the random access device may comprise a removable direct access storage device, and the computer may comprise a mainframe computer.

In yet another aspect of the present invention, the programmable storage controller is further provided with a dispatcher for controlling the operation of the programmable storage controller. The channel interface controller is provided with an interrupt processor, responsive to a command received by the one or more channel programs, for interrupting the dispatcher, thus causing establishment of another unit thread, and a device for calling the execution of the another unit thread. The channel interface controller may also be provided with a device for controlling the one or more channel interface circuits and further a device for retrieving at least one of the channel programs.

In accordance with yet another aspect of the present invention, the programmable storage controller further comprises a device for signalling that data to be read from the storage facilities is compressed, and a device for decompressing data. The programmable storage controller may also be provided with a device for signalling that data to be written should be compressed, and a device for compressing data. The device for compressing and the device for decompressing may be implemented by embedded code, or they may be implemented by the use of parallel RISC processors.

In accordance with yet a further aspect of the present invention, the second interface is provided with at least one standard high-speed parallel interface.

The computer may comprise a general purpose computer; the programmable storage controller may be provided with a device for accommodating a plurality of different kinds of storage devices which comprise the storage facilities; and the programmable storage controller may further be provided with a device for accepting and executing storage related commands from host channels having different program languages and dialects.

In accordance with a further aspect of the present invention, the computer of the storage controlling system may be configured in the form of a general purpose microcomputer, a personal computer, or a tightly coupled multi-processor.

In accordance with yet a further aspect of the present invention, the general purpose computer comprises a specialized operating system.

In yet a further aspect of the present invention, the second interface is further provided with an interface to another storage controller, wherein the programmable storage controller comprises a communication bridge for communicating with the another storage controller. The programmable storage controller may be provided with a plurality of customized controller services, such as a caching algorithm, and a device for performing data compression and decompression.

The storage controlling system may include the controller services. In addition, the storage controlling system may also include the at least one host and the storage facilities.

In a further aspect of the present invention, the at least one host may include at least one of a mainframe, a mini, and a microcomputer.

In a yet further aspect of the present invention, the equipment controllers comprise reentrant stored programs.

In an alternative embodiment of the present invention, a storage controlling method is provided for transferring information between one or more different types of target units and one or more channels of at least one host. The storage controlling method includes a number of steps such as receiving one or more channel programs transmitted from the one or more channels of the at least one host, wherein the channel program carries data, status, information and commands. During execution of the method, storage facilities, which include the one or more target units, are interfaced, and exchanges of storage data to and from the target units are controlled.

In a particular aspect of this alternative embodiment, channel program commands are translated in order to determine a target unit for which at least one channel program is transmitted, a unit thread is established, and channel program data is passed to the unit thread. The unit thread is established by choosing an equipment controlling routine from a set of equipment controlling routines which interpret data control commands and status information and control data transfers to and from storage facilities in accordance with the channel program command. Each equipment controlling routine is chosen as a function of the type of equipment that the channel program requests as a target. In addition, each equipment controlling routine, when executed, calls or initiates a storage control management routine.

During passing of channel program data to the unit thread, the unit thread is executed by executing the chosen equipment controlling routine.

The target units may comprise random access and sequential storage devices, and the type of equipment for which the host is configured may be different than the target units.

In a particular aspect of the alternative embodiment, the data being transmitted to and from the storage facilities is cached. In addition, the inputs and outputs to and from the storage facilities may be prioritized. In accordance with another particular aspect of the present invention, during execution of the equipment controlling routine, data is transferred to and from random access and sequential storage devices. The random access devices may include a removable direct access storage device while the computer comprises a mainframe computer.

In accordance with yet another aspect of the present invention, an interrupt processing is executed responsive to a command received by the one or more channel programs, thus causing another unit thread to be established and executed.

For purposes of clarification in defining the present invention in the following disclosure, the below-listed terms used herein are defined:

| | |
|---|---|
| microprocessor | a central processing unit (CPU) on a single chip |
| computer | a machine that performs three functions: accepts structured input, processes it according to prescribed rules, and produces the results of the processing as output; examples of computers include super computers, mainframes, super mini computers, mini computers, work stations, personal computers, and microcomputers |
| general purpose computer | a computer which is provided with enough facilities to allow it to implement a wide range of different unrelated operating systems and/or applications |
| personal computer | a computer designed for use by one person at a time |
| microcomputer | a computer which runs with the use of a single-chip microprocessor; a microcomputer is typically less powerful than a mini computer and a mainframe computer |
| central processing unit | the computational and control unit of a computer; the CPU is the chip that functions as the "brain" of a computer |
| channel | a path or link through which information passes between two devices; a channel can be either internal or external to a computer |
| embedded code | code that is built into its carriers rather than associated with or called by them when needed; embedded code is used to make a program run faster or more efficiently or to provide a capability not available in a high-level language |
| RISC processor (reduced instructions set computing) | a type of microprocessor designed to efficiently process a relatively small set of instructions; the number of instructions built into the microprocessor is limited so that each instruction may be optimally carried out very rapidly, usually within a single cycle |

BRIEF DESCRIPTION OF THE DRAWINGS

The present invention is further described in the detailed description which follows, by reference to the noted plurality of drawings, by way of non-limiting examples, of preferred embodiments of the present invention, in which like reference numerals represent similar parts throughout the several views of the drawings, and wherein:

FIGS. 3a, 3b, 3c and 3d illustrate a number of flow charts which explain the general flow of the programmable storage controller according to a first embodiment of the present invention;

FIG. 5 illustrates a third embodiment of the storage controlling system of the present invention.

DETAILED DESCRIPTION OF THE PREFERRED EMBODIMENTS

Figure 1:
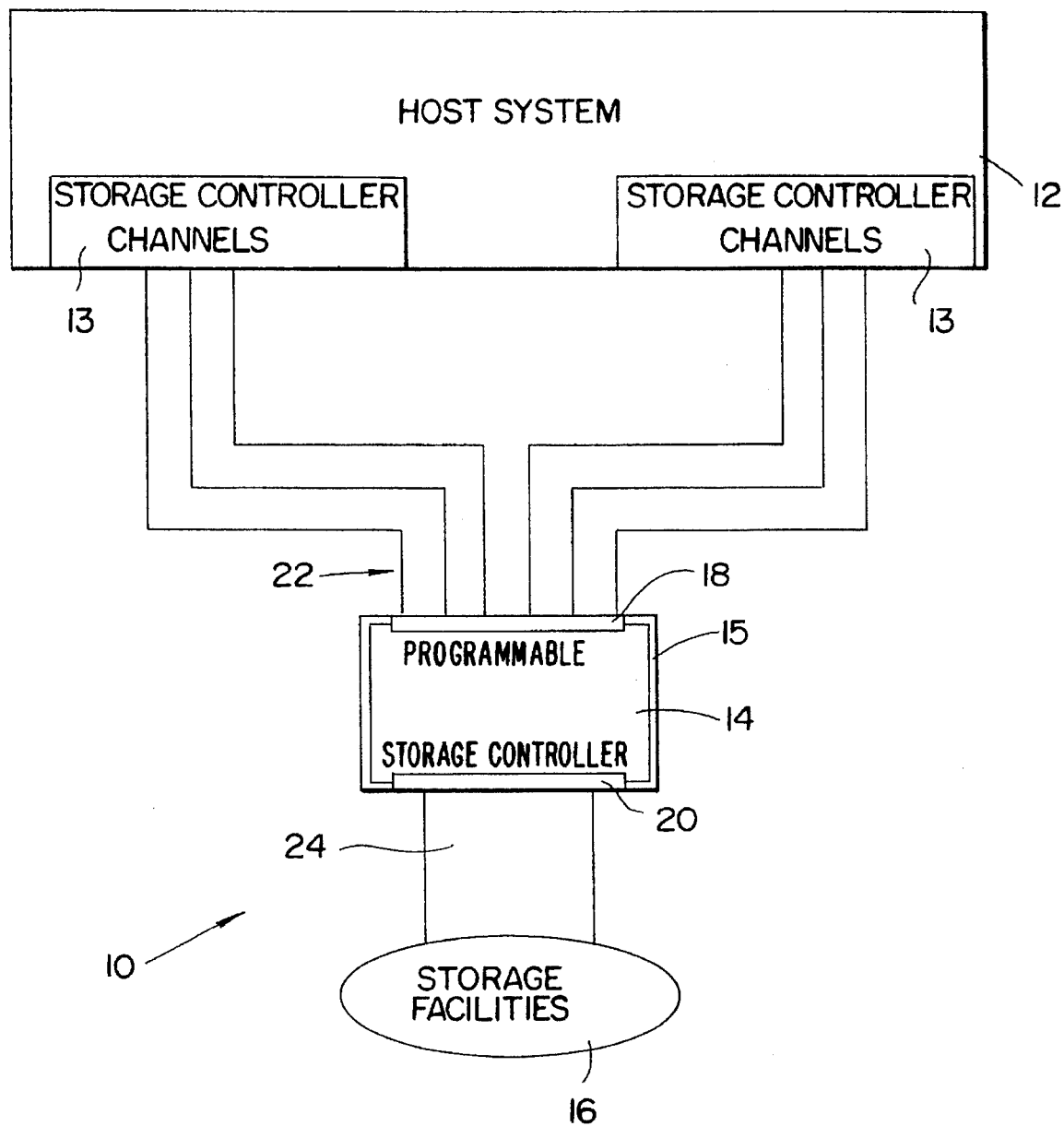
FIG. 1 illustrates basic elements of the storage controlling system of the present invention.

Referring to FIG. 1, a storage controlling system 10 is illustrated which comprises a host system 12, a programmable storage controller 14, and storage facilities 16. Host system 12 is provided with one or more storage controller channels 13 which are connected to programmable storage controller 14 through a first interface 18. Storage facilities 16 are also connected to programmable storage controller 14, through a second interface 20.

Programmable storage controller 14 is implemented on a computer 15 having a first interface 18 and a second interface 20. Computer 15 is coupled to host system 12 via host connectors 22, which form a connection between storage controller channels 13 and first interface 18. Meanwhile, storage facilities 16 are connected to second interface 20 of the computer 15 via storage facility connectors 24.

Depending upon the type of computer which is used to implement the programmable storage controller 14, the type of host system being used, the type of storage facilities, and the host and storage facility connectors, different types of first and second interfaces 18, 20 may be implemented with various types of hardware. For example, specialized mainframe interface hardware may be constructed in order to provide the needed connections and signalling protocol to allow communication between host system 12 and computer 15. Second interface 20, which is coupled to storage facilities 16, may comprise one or more standard high-speed parallel interfaces, such as SCSI interfaces.

In a case where the host system is an IBM mainframe complex, host connectors 22 comprise bus and tag cables. Storage facility connectors 24 may be, e.g., configured in the form of ribbon cables, which extend to one or more drive mechanisms of storage facilities 16.

Depending upon the type of computer being used to implement the programmable storage controller 14, the type of host system, and the type of bus and tag cables which are connected to storage controller channels 13 of the host system, first interface 18 must have a number of features which render computer 15 compatible with the existing hardware of the host system and the bus and tag cables. For example, first interface 18 must have the following characteristics (in the case of an IBM ES 9000 mainframe host computer connected to an IBM compatible personal computer used to implement the programmable storage controller): First interface 18 (which will usually comprise an interface card) must conform to the specific signalling protocol (i.e., channel language) requirements of the host channel, such as Federal Information Processing Standard Publication for the Block Multiplexor I/O Channel Interface (FIPS-60); See FIPS PUB. 60-2, which is expressly incorporated by reference herein in its entirety. In addition, the interface card of first interface 18 must conform to the specifications for the bus architecture used to transfer data between interface 18 and the center processor and memory of computer 15.

Host system 12 requests data via an addressing scheme which assigns each block of data a device address, cylinder, and track. These address parameters are then translated by a disk controller into the actual physical address based on the controller's knowledge of the peripherals attached to it. The host operating system must receive consistent responses/results in accordance with the requests that it makes. For example, it expects the same data to be returned or written when it presents the same logical address. Programmable storage controller 14 and computer 15 are simply attached to the storage controller host system 12, channels of and may be configured to provide many general functions, such as: (1) emulating all of the responses of a standard storage controller which typically supports the host system; (2) translating each data address requested to physical addresses that can be satisfied by the storage facilities connected thereto; and (3) enhancing the performance of the storage facilities through use of, e.g., compression and decompression of data, disk striping, and caching.

In the embodiments of the storage controlling system which are discussed in the following description, programmable storage controller 14 is implemented by means of software code used to configure and run computer 15. At the same time, host system 12, storage controller channels 13, host connectors, storage facility connectors, first interface 18, second interface 20, and storage facility 16 are each implemented by means of hardware. Although these elements are disclosed as being implemented respectively with software and hardware, any one or all of the elements of the storage controlling system may be interchanged with hardware, firmware and/or software, depending on the type of host system, and design factors, such as efficiency of operation and cost.

Figure 2:
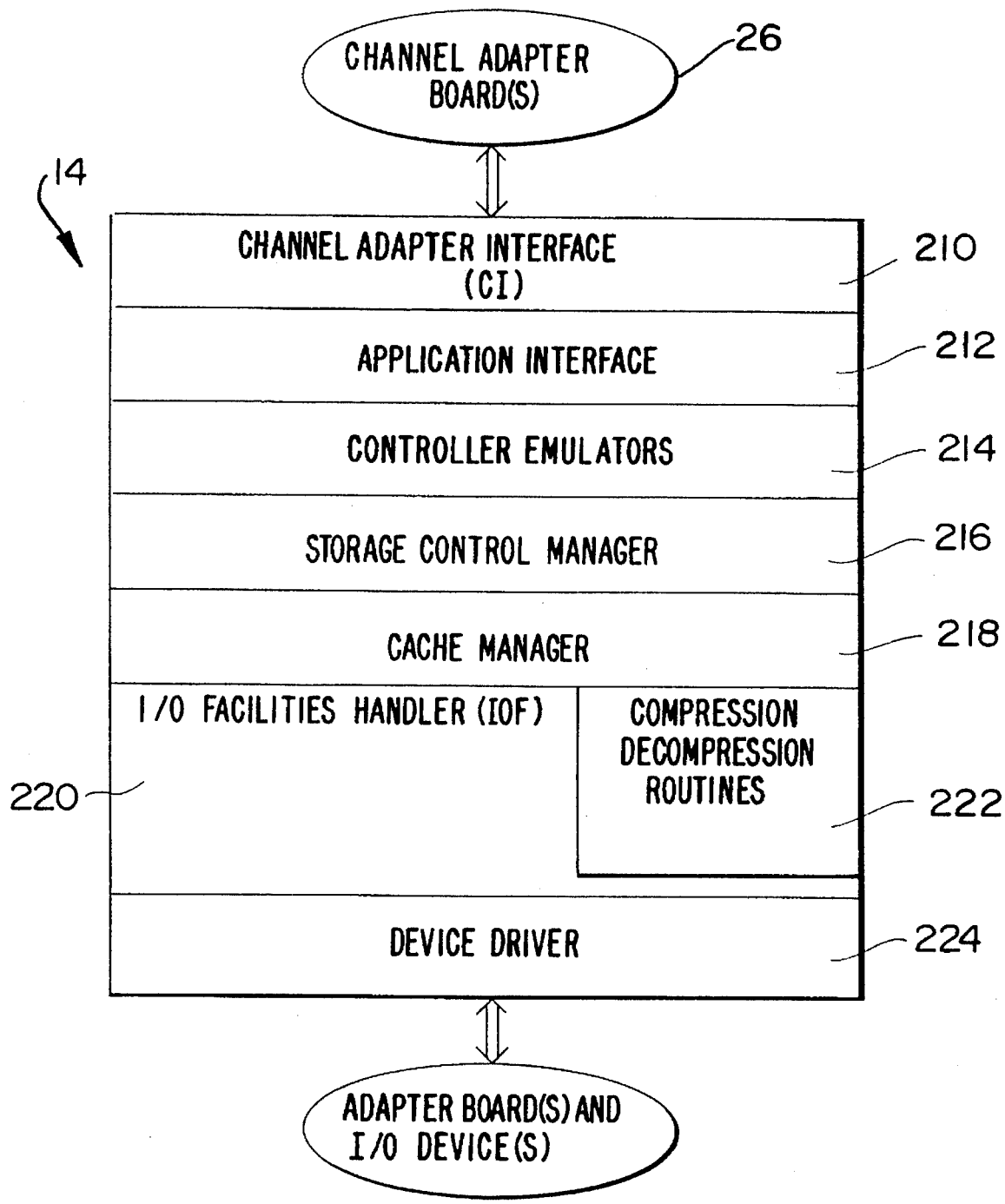
FIG. 2 illustrates a block diagram of the various elements which comprise the programmable storage controller of the present invention.

Referring to FIG. 2, programmable storage controller 14 is provided with a channel adapter interface (CI) 210, an application interface (or dispatcher) 212, one or more controller emulators (equipment controllers) 214, a storage control manager 216, a cache manager 218, an I/O facilities handler (IOF) 220, a set of compression/decompression routines 222, and a device driver 224. Channel adapter interface 210, which is preferably implemented with software, provides a mechanism which allows application interface 212 to control other portions of the programmable storage controller, and also control channel adapter boards 26 (and thus the storage controller channels 13 of host system 12). CI 210 provides data, status, and commands from the channel, in the form of a channel program, to one or more controller emulators 214 which control data and status command exchanges with one or more target units. Application interface 212 handles command requests which are detected by CI 210 as incoming data streams. CI 210 is provided with an interrupt processor which causes execution thereof, and thus sets application interface 212 into action.

Application interface 212 routes the incoming commands (in the form of channel programs) to one or more controller emulators 214, by establishing and scheduling one or more unit threads based on the particular device (target unit) requested by the host system through the channel program. Application interface 212 uses a configuration table to determine which controller emulator should receive a request based upon the type of equipment the channel expects as a target. If the controller emulator which is needed to establish the unit thread is not currently loaded in memory of computer 15, application interface 212 will request the program to be loaded.

For each new target unit requested by a particular channel, application interface 212 initiates a new thread (by building a unit thread semaphore, having an assigned number corresponding to the requested target unit). Each unit thread comprises a controller emulator, (i.e., an equipment controller) which corresponds to the particular device (i.e., target unit) requested by the channel. Upon execution of the one or more controller emulators, the commands which are sent from the channel are retrieved by controller emulator 214 through use of channel adapter interface 210. Controller emulator 214 acts upon each valid command received by the host channels, by either reading or writing data, or performing some other miscellaneous processing, such as setting a file mask, configuring one or more particular devices, or issuing data and statuses of particular devices and data. Upon completion of one of these processes in accordance with the command received, a status is sent back to host system 12, signalling the state of the processing (e.g., completion of the command), and the results of the processing.

During execution of controller emulator 214, if the command received from the channel requires storage facility data to be referred, storage control manager 216 is called, which in turn calls cache manager 218 in order to establish access of the data requested to the controller emulator 214. If the requested data is not readily available in the cache, cache manager 218 then calls I/O facilities handler (IOF) 220 in order to execute a physical I/O of the data. If the data is compressed and must be decompressed, IOF 220 then calls compression/decompression routines 222 during retrieval of the data. Similarly, if IOF 220 is called to physically send data to the storage facilities, and if this data is to be compressed, compression/decompression routines 222 are again called. IOF 220 sends or retrieves data to or from storage facilities 16 via device driver 224.

A controller emulator is defined by the set of channel commands and channel programs which it interprets. The characteristics of a controller emulator are dependent on the definition of each channel command and channel program.

The controller emulators may interpret the channel commands and channel programs to control devices such as fixed and variable length record direct access storage devices, sequential access storage devices, and communication controllers.

The controller emulator must interpret each channel command and produce results consistent with the controller protocol which it is emulating. That is, the operation of the controller emulator should be transparent to the end user, the operator, and to the operating system hardware configuration parameters.

A unique and separate controller emulator is provided for each unique and separate target unit "type" specified by the channel. A unit thread is provided for each target unit specified by the host channel. Thus, since there may be many target units of the same type, there will typically be a plurality of unit threads assigned to a single controller emulator. Should the host be an IBM mainframe computer, which typically communicates with direct access magnetic storage using ECKD (extended count key data) format, the controller emulator must perform a somewhat more complicated translation or interpretation function in order to adapt the commands and data to an appropriate generic intermediate format readable by the device driver. On the other hand, if the host merely uses a fixed block I/O, the controller emulator will be much less complicated than the case for ECKD.

For specific examples of Direct and Sequential storage device channel command and program definitions which the controller emulators may be configured to interpret, please refer to *IBM 3990 Storage Control Reference* (GA32-0099-3) and *IBM 3480 Magnetic Tape Subsystem Reference: Channel Commands, Status and Sense Bytes, and Error Recovery Procedures* (GA32- 0042-6), each of which are expressly incorporated herein by reference in their entireties.

Host system 12 physically attaches to a storage controller through channel 13 which uses a unique addressing scheme. The programmable storage controller 14 may communicate with multiple channel interface cards of the channels, thus allowing multiple host channels to communicate with a single storage subsystem (i.e., the combined system of programmable storage controller 14 and storage facility 16). This allows multiple assembly host architectures (e.g., the IBM 370 Class, and Unisys 2200 Class) to communicate with a single parameter storage controller. The adapter card which is in the channel of the host system receives and passes on channel program commands and requests which are configured in a channel specific format. Meanwhile, application interface 212, which knows what type of host is connected to the channel adapter interface of the host, chooses an appropriate controller emulator which corresponds to the host, and assigns a unit thread representing that controller emulator.

The controller emulator 214 translates the channel program commands/requests from a channel-specific format to a "generic" format including generic address information and generic requests. Thereafter, storage control manager 216 receives the generic address and generic request information from the controller emulator 214, and translates the generic address/request to a physical target ID and data address which can then be routed to the IOF 220. The IOF 220 controls distribution of the request to the caching, striping, compression/decompression mechanisms, and/or device driver 224.

A particular embodiment of programmable storage controller 14 will now described with reference to FIGS. 3a–3d.

Figure 3A:
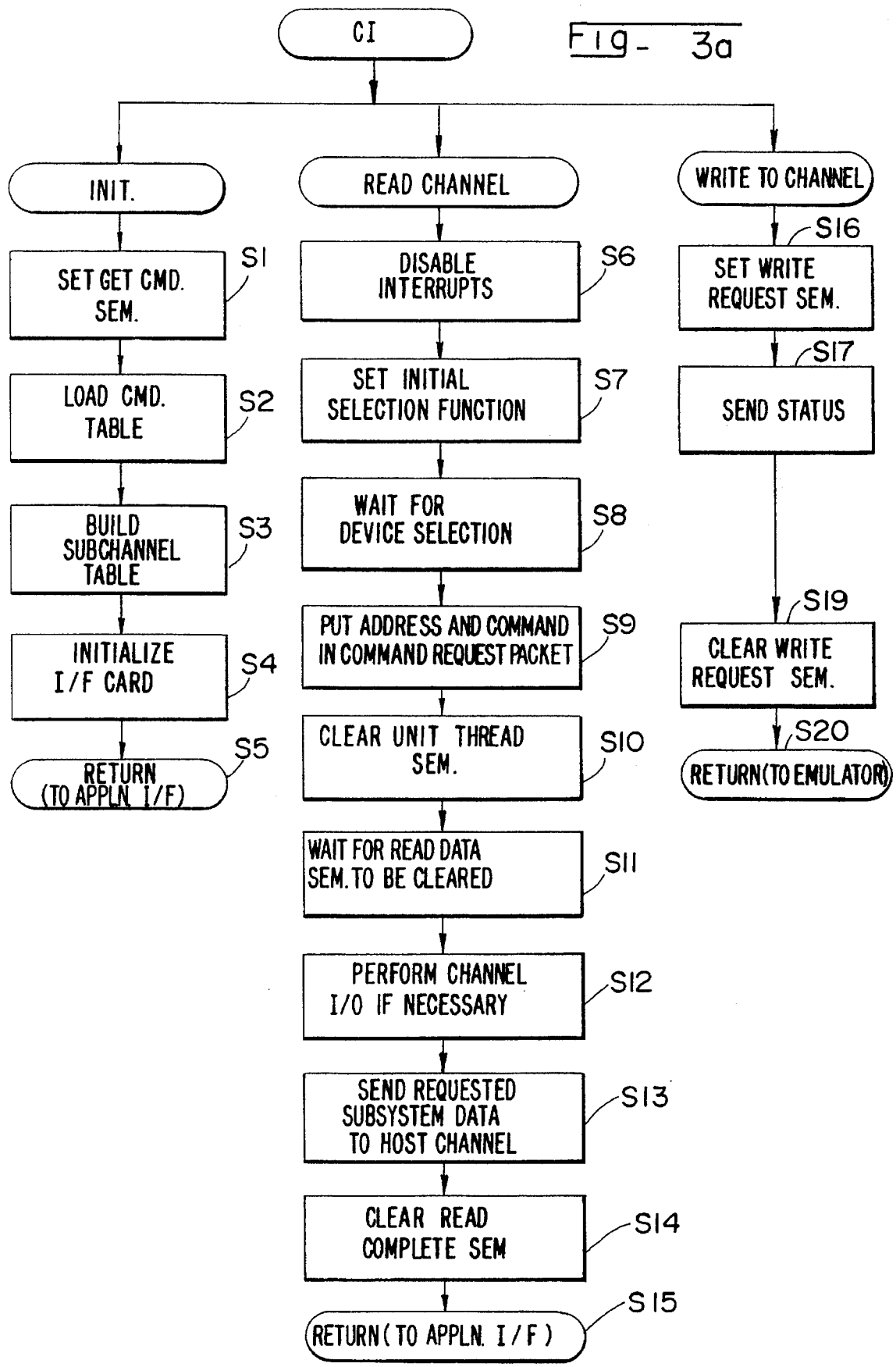
Figure 3B:
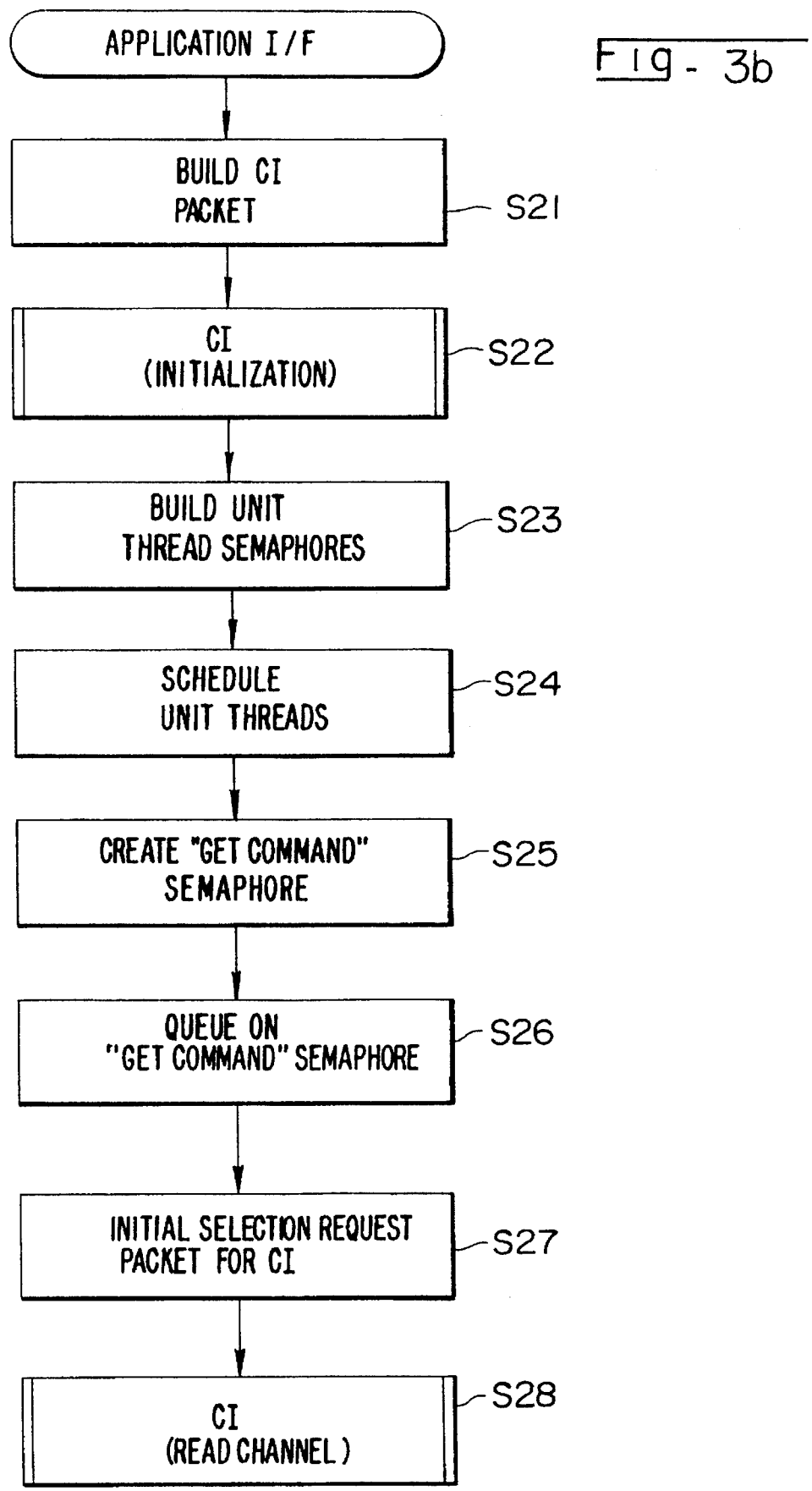

The application interface (or dispatcher) flow of operation is described in FIG. 3b. During execution of the application interface, in step S21, a packet is built into interface 18 for the CI which contains subchannel and command table information. Thereafter, in step S22, execution of the CI initialization (FIG. 3a, steps S1–S5) is called. Upon completion of CI initialization, which results in the execution of steps S1–S5 (FIG. 3a), the application interface then builds one or more unit thread semaphores; one unit thread semaphore is built for each device configured in the host system. Thereafter, in step S24, the one or more unit threads are scheduled, and thus initialized. Upon completion of scheduling/initialization of the unit threads, in step S25, a "get command" semaphore, is created. Then, steps S26–S28 are executed in response to clearance of the "get command" semaphore as indicated at step S26, which queues on the "get command" semaphore. Upon building an initial selection request packet for the CI in step S27, the application interface calls the CI for execution of the read channel processing (steps S6–S15, FIG. 3a).

An initial selection request packet, which is built in step S27, performs the functions of allowing initial device selection, storing target addresses and channel commands, providing initial status, and supporting data transfer functionality between the host channel and the programmable storage controller.

The CI (i.e., the channel adapter interface) functions as a device driver for carrying out I/O to and from the one or more storage controller channels 13 of host system 12. Thus, whenever data is either written to or read from the one or more storage controller channels 13, the CI must be executed in some fashion. In order to execute a "read channel" function, the read channel portion of the CI is called (see steps S6–S15). In order to execute a "write channel" function, the "write to" channel portion of the CI is called for execution (steps S16–S20).

FIG. 3c shows the flow of an individual controller emulator, which, when executed, comprises a unit thread. At step S30, the controller emulator waits for its unit thread semaphore to be cleared. Since there may be a plurality of unit threads which may be specified by the application interface (at step S23 thereof), each unit thread semaphore is assigned a particular number. Upon clearance of the unit thread semaphore (with the appropriate number), at step S31, the controller emulator retrieves the command and parameters from the CI. It is in this step (S31) that the controller emulator clears the appropriate semaphore, which allows reading of the data and commands by the CI during execution of the read channel processing. In addition, certain host-specific processing, such as translation and/or interpretation of the particular dialect of the I/O signaling protocol, if necessary, is performed in step S31. The controller emulator parses the command in step S33; that is, it is determined whether or not the command is valid. If the command is not valid, an error status is issued in step S39, and the processing returns to step S30 where the unit thread sleeps until its semaphore is again cleared.

If the command received by the CI is determined to be valid in step S33, another determination is made in step S34 as to whether or not the controller emulator must reference stored data for either a read or write operation. (it is noted that when the controller emulator is instructed to either read or write data to or from the storage facilities, the programmable storage controller must reference stored data in some way). If the controller emulator must reference stored data, the storage/cache manager is called in step S35. If the controller emulator is not required to reference stored data, one or more miscellaneous processings will be performed, depending upon the type of command received from the channel. This processing is indicated at step S40. Some examples of such miscellaneous processing include setting a file mask, configuring the devices, and issuing data and status information relating to the devices.

In step S35, the stored data which must be referenced is so referenced. That is, the storage/cache manager finds the data and returns an index to the controller emulator indicating where the controller emulator may find the data. Once this data is indexed in step S35, the controller emulator then makes another determination at step S36 as to what type of command is to be executed as instructed by the storage controller channel of the host system. If it is a read command, the controller emulator sends the data and status to the host by calling the CI (write to channel) (steps S16–S20), and returns to step S30 where it sleeps until the unit thread semaphore is again cleared. If the command by the host is a write command, the controller puts the data to be written in the cache buffer and sends a status back to the host by the use of the CI (write to channel) program. Upon sending this status, the controller emulator returns to step S30. After execution of each of steps S37, S38, S39, and/or S40, prior to returning to step S30, in step 40.1, the controller emulator clears the get command semaphore, thus allowing the application interface to execute steps S26–S38 and retrieve the appropriate command for use by the controller emulator.

As shown in FIG. 3a, the channel adapter interface (CI) comprises three processings including initialization, read to channel, and write to channel processings. The initialization processing comprises steps S1–S5. In step S1, the CI sets the get command semaphore. Upon setting of the get command semaphore, the processing then loads a command table in step S2, loads a subchannel table in step S3, and initializes the interface card of the storage controller channel 13 in step S4. Thereafter, in step S5, the channel interface returns to where it was called, which in this case is the application interface at step S22.

The read channel processing of the CI comprises steps S6–S15. In step S6, the interrupts of the storage controller channels are disabled. Upon disabling of the interrupts of the storage controller channel interface card, in step S7, the CI sets the initial selection function, which in turn allows the host to perform initial device selection. Once the initial selection function is set, the CI waits for a device (target unit) selection by the storage controller channel in step S8. Then, in step S9, the CI puts the address and command of the device (target unit) selection in the initial selection request packet, which is built into step S27 of the application interface (FIG. 3b). Thereafter, in step S10, the unit thread semaphore corresponding to a desired controller emulator is cleared, thus causing the appropriate controller emulator to be executed. In step S11, the CI waits for the read data semaphore to be cleared. This occurs in step S31 of the controller emulator, where the controller emulator gets the command and parameters from the CI. If an I/O is necessary, in step S12, the CI performs such channel I/O. Thereafter, in step S13, the data requested by the host channel (subsystem data) is sent to the host channel. The read complete semaphore is then cleared in step S14, and the processing is returned to where it was called, which is, in this case, step S28 of the application interface.

The write to channel processing of the CI comprises steps S16–S20. In step S16, the write to channel processing of the CI sets the write request semaphore, thus prohibiting or preventing any unwanted or unauthorized concurrent write to channel requests by other controller emulators of the programmable storage controller. Thus, the write request semaphore ensures that the status which is being transferred to the channel by use of the write to channel processing is not disturbed. Once the write request semaphore is set, in step S17, the status is sent from the controller emulator to the interface card of the controller channel. Once the status is sent, the write request semaphore is cleared in step S19, thus freeing use of the write to channel processing of the CI by another controller emulator which may be waiting in line. At step S20, the processing is returned to where it was called, which, in this case, is at either of steps S37 and S38 of the controller emulator.

Figure 3D:
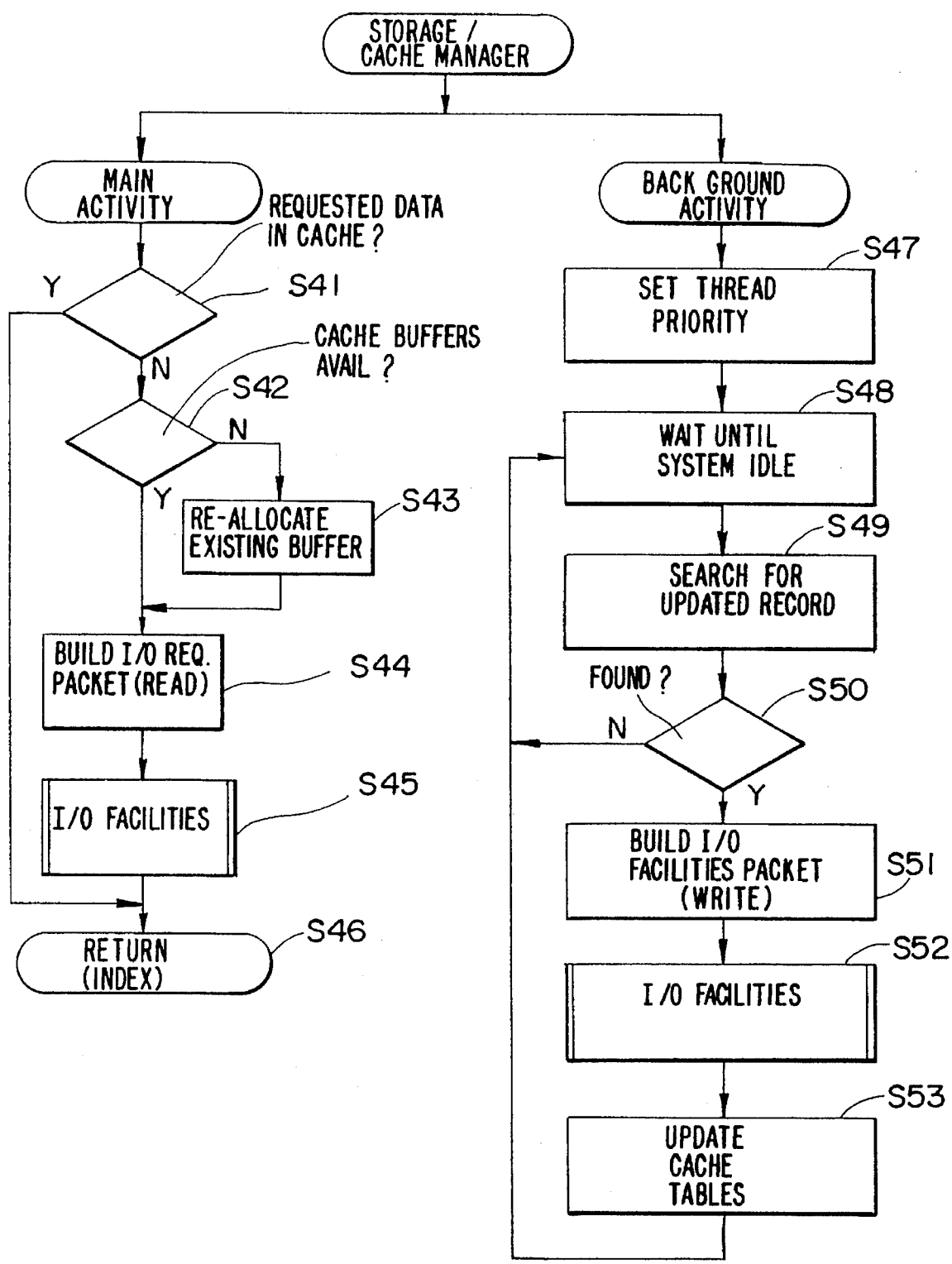

As shown in FIG. 3d, the storage/cache manager comprises two main processings: a main activity, and a background activity. The main activity is that which is activated when the storage/cache manager is calling by the controller emulator. For example, when called in step S35 of the controller emulator (see FIG. 3c), the main activity of the storage/cache manager is activated, which causes steps S41–S46 (see FIG. 3d) to be executed. At step S41, a determination is made as to whether the requested data is in cache. If the requested data is in cache, the processing skips to the return step, S46, and the storage/cache manager returns an index indicating where the requested data is in the cache, thus allowing the controller emulator to access the data. If, however, the requested data is not in cache, as determined in step S31, another determination is made in step S42 as to whether one or more necessary cache buffers are available. If not, an existing buffer is reallocated in step S43. However, if the cache buffer is available, the processing immediately proceeds to step S44 where an I/O request packet is built for a read operation. Thereafter, the IOF is called in step S45, which results in a physical I/O of data between the cache buffer and a storage device. In step S46, the processing returns to the controller emulator.

The background activity of the storage/cache manager is performed by steps S47–S53. In step S47, the manager sets the unit thread priority of the system. Then, in step S48, the storage/cache manager waits until the system becomes idle. Once there is idle time in the system, the storage/cache manager will search for an updated record. If the updated record is found in the determination step S50, the processing proceeds to step S51, where an I/O facilities packet for writing is built. The IOF is called in step S52, and the cache tables are updated in step S53. Thereafter, the system returns to step S48, where the storage/cache manager either waits for the main activity processing to be called, or for the system to become idle and for an updated record, in steps S48 and S49.

IOF 220 interfaces with storage facilities via a device driver 224 (see FIG. 2). One or more device drivers may be provided depending on the particular peripheral storage devices which are connected to second interface 20 of the storage controlling system 10 (see FIG. 1). In a preferred embodiment, a device driver is provided as disclosed in copending U.S. patent application Ser. No. 07/882,003, filed concurrently with the present application, now abandoned, the disclosure of which is expressly incorporated herein in its entirety. The device driver disclosed therein is capable of self-configuring itself upon IPL (Initial Program Load) to support a number of different peripheral devices for input and output thereto.

In calling of either of the channel adapter interface 210, and the device driver 224 an IOTCL interface is used to avoid the overhead of the host controller operating system file structure system checks. This allows more efficient access directly to the media of the storage facilities.

Should the programmable storage controller be provided with disk striping, it is noted that IOF 220 (FIG. 2) should include a mechanism for executing one or more switch lists and priority ranked service queues, prioritizing I/O, and routing to appropriate physical storage devices and channels. It is noted that a number of separate and independent reads and writes will be simultaneously executed for certain portions of data if data striping is utilized.

With respect to the embodiment previously discussed, there are a number of features or modifications which may provide this embodiment with certain advantages. For example, the compression/decompression mechanisms may be implemented by use of dynamic data compression algorithms. The compression/decompression mechanisms may utilize either static or adaptive techniques. Examples of static compression/decompression techniques include, but are not limited to, run-length encoding, bit mapping (Huffman), and arithmetic coding. Adaptive techniques may include, for example, Huffman and the Ziv-Limpel (LZ) variants. Data compression/decompression mechanisms are described in some detail in *Text Compression*, Timothy C. Bell, John G. Cleary, Ian H. Witten, 1990 Prentis Hall, Inc., which is expressly incorporated herein by reference in its entirety.

In addition, ASIC's (application specific integrated circuits) and high density gate arrays may be used to implement various portions of the storage controlling system, such as the IOF, the device driver, and the second interface, thus enhancing I/O. Microprocessors such as the Intel 80486 and 80586, or the Motorola 68030 and 68040, may be used to implement computer 15. These microprocessors provide great amounts of compute power in very small space, inexpensively, and within a relatively hostile environment, e.g., under undesirable environmental conditions such as heat and humidity.

In one modification to the first embodiment of the present invention, the programmable storage controller is implemented with a specialized operating system in conjunction with a tightly coupled multi-processor. The specialized operating system should be provided with a number of features including tightly coupled multi-processor support, a sophisticated multi-tasking scheduler having preemptive support and real time support, and memory allocation. In addition, the specialized operating system should not have too many features; that is, the OS should be provided with only the "bare essential elements," without any significant video, keyboard, or character I/O support. It is also preferred that the specialized operating system have the ability to subdivide and swap operating system functions to allow an application program and only the essential OS services to use the processors at one time.

A number of new peripheral technologies can be considered as particularly beneficial and desired for the storage facilities connected to second interface 20 of storage controlling system 10. For example, rewritable optical disks, optical tapes, and 4 mm digital tapes (DAT) have a number of beneficial characteristics such as large storage capacities, quick access time, and low floor space and power requirements.

Figure 4:
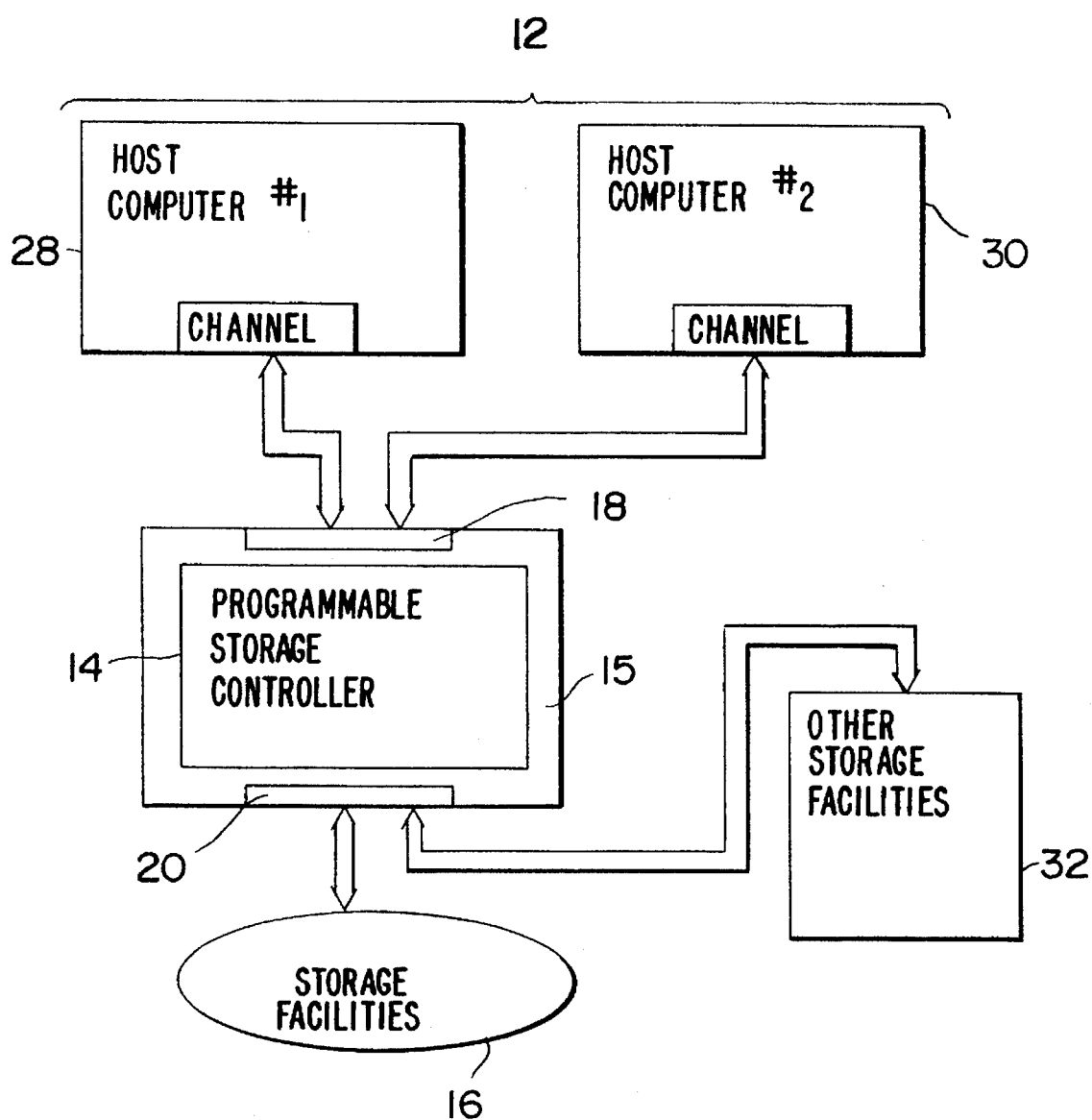
FIG. 4 illustrates an additional embodiment of the invention.

FIG. 4 illustrates a block diagram of a further embodiment of the present invention. In this embodiment, host system 12 is provided with first and second host computers 28, 30, and an additional "other" storage controller 32 is connected to interface 20 of computer 15. In order to effect communication between programmable storage controller 14 and other storage controller 32, a mechanism must be provided for interfacing other storage controller 32 with appropriate portions of programmable storage controller 14, so as to allow communication of various commands, status and data therebetween. This mechanism may include an inter-controller communication bridge. The inter-controller communication bridge may comprise of a separate controller emulator which provides translation functions allowing the host computer to communicate with storage controller 32. The controller emulator makes the appropriate translation of host requests to the generic format, which is then interpreted by the storage control manager. The storage control manager then further translates the instructions and commands into an appropriate protocol which may be interpreted by the other storage controller 32 as actions or commands to respond to.

This additional inter-controller communication bridge may be provided in order to accommodate functions such as backing up one storage channel with another, or to provide alternate routes of communication in case a channel interface or storage controller has been disabled because of hardware or software failure. It is noted that although FIG. 4 indicates a particular configuration of the inter-controller connection, other storage controller 32 may be connected to first interface 18 rather than second interface 20.

In order for the programmable storage controller 14 to accommodate a number of different host computers, such as first host computer 28 and second host computer 30, each unit thread which is established and scheduled by application interface 212 (see FIG. 2) should further be provided with an interpretor which may interpret the different channel languages and/or channel dialects of the communication interface used by the one or more host computers.

A channel language is defined to be the electrical and control signalling sequences of the host interface. A channel program dialect is defined to be the ordering and context sensitive nature of the command signals within a specific channel language. Examples of channel languages include FIPS 60 and SCSI (Small Computer Systems Interface). Examples of dialects of, e.g., the FIPS 60 channel language include FIPS 60 as implemented by Unisys and FIPS 60 as implemented by IBM.

Different types of host computers may be accommodated by use of an interpretor provided in the unit thread, each interpretor being specific to each particular host computer, while each controller emulator is chosen depending on the target unit specified by the channel of the host computer. The interpretor not only interprets the different commands sent by the channel of the host computer, but also interprets (for the host) the return status information being sent back to the host computer.

Another embodiment of the storage controlling system of the present invention is depicted in FIG. 5. As shown in this figure, one or more mainframe computers, which may be, for example, IBM mainframes, are connected to mainframe interface hardware 52 of a microcomputer 54. Microcomputer 54 includes an IBM compatible personal computer with, for example, either an 80486 or 80586 microprocessor. Microcomputer 54 is configured with a programmable storage controller 14 having a SCSI device driver 56, which interfaces with a plurality of SCSI interfaces connected to optical disks 60, which comprise the storage facilities in the present embodiment.

This second embodiment is explained below with reference to an IBM 3990 mainframe disk controller; however, it is easily applicable to any IBM mainframe computer or minicomputer which uses ECKD to send and retrieve data to and from magnetic disks. The system shown in FIG. 5 provides a full scale emulation of the IBM 3990 mainframe disk controller and its associated magnetic disk using a microcomputer and one or more rewriteable optical disks 60. The programmable storage controller 14' may be provided with compression and decompression algorithms. In addition, mechanisms may be provided which allow striping of I/O operations so that each I/O to and from optical disk 60 is subdivided into several parallel read and write efforts. In addition, the microcomputer may be provided with mechanisms for caching, and a staging device for read operations and look ahead reads.

The embodiment of FIG. 5 has a number of benefits in that magnetic disks which are supported by mainframes have a relatively large footprint, and are extremely expensive to support. On the other hand, rewritable optical disks, as do other optical storage media, allow data storage at a fraction of the cost, space, and environmental requirements of the magnetic disk.

While the invention has been described with reference to a number of preferred embodiments, it is understood that the words which have been used herein are words of description, rather than words of limitation. Changes may be made, within the purview of the appended claims, without departing from the scope and spirit of the invention in its various aspects. Although the invention has been described herein with reference to particular means, materials and embodiments, it is understood that the invention is not be limited to the particulars disclosed herein, and that the invention extends to all equivalent structures, methods and uses such as are within the scope of the appended claims.

What is claimed is:

1. A storage control subsystem connected between one or more storage controller channels of at least one host system and data storage facilities comprising a plurality of target units, said storage control subsystem comprising:

a programmable storage controller that emulates a plurality of types of target unit specific storage controllers, said programmable storage controller being implemented with an application program and a computer, said computer being configured by said application program;

a first interface for interfacing a plurality of channel adapters which carry a plurality of channel programs transmitted from the channels of the host system to said programmable storage controller, each channel program having means for carrying data, status information and commands; and a second interface for interfacing said programmable storage controller to said target units;

said programmable storage controller comprising a plurality of controller emulators, said controller emulators comprising means for translating said channel programs and commands from a channel specific format to a generic format of said programmable storage controller that includes generic address and request information, to thereby facilitate data and status command exchanges with said plurality of target units.

2. The storage control subsystem according to claim 1, wherein said programmable storage controller comprises:

means coupled to each said channel adapter for translating channel program commands and determining, from each channel program, a target unit for which at least one channel program command is transmitted;

a set of equipment controllers which interpret channel program commands and status information, and control data transfer to and from said storage facilities in accordance with the channel program commands, each equipment controller comprising means for calling a storage control manager;

means for establishing a unit thread by selecting an equipment controller from said set of controllers, each equipment controller being selected by said means for establishing as a function of the type of equipment that the channel program requests as a target;

means for passing channel program data to said unit thread; and means for executing said unit thread by executing said equipment controller.

3. The storage control subsystem according to claim 2, wherein said storage control manager comprises a cache manager.

4. The storage control subsystem according to claim 2, wherein said equipment controller further comprises means for prioritizing input and output to and from said storage facilities.

5. The storage control subsystem according to claim 2, wherein each of said channel adapters comprises one or more channel interface circuits, and further wherein said first interface comprises a channel interface controller.

6. The storage control subsystem according to claim 2, wherein the type of equipment for which the host is configured is different than one of said target units.

7. The storage control subsystem according to claim 5, wherein said second interface comprises at least one of a random access and a sequential storage device channel adapter.

8. The storage control subsystem according to claim 7, wherein said storage control subsystem comprises at least one of a random access and a sequential storage device.

9. The storage control subsystem according to claim 8, wherein said storage control subsystem comprises a random access device which comprises a removable direct access storage device.

10. The storage control subsystem according to claim 9, wherein said host system comprises a mainframe computer.

11. The storage control subsystem according to claim 5, wherein said programmable storage controller further comprises a dispatcher for controlling the operation of said programmable storage controller, and further wherein said channel interface controller comprises an interrupt processor, responsive to a command received by each of said channel programs, for interrupting said dispatcher, thus causing said means for executing to execute another unit thread.

12. The storage control subsystem according to claim 11, wherein said channel interface controller further comprises means for controlling said one or more channel interface circuits and means for retrieving at least one of said channel programs.

13. The storage control subsystem according to claim 1, wherein said programmable storage controller further comprises means for signalling that data to be read is compressed, and means for decompressing data.

14. The storage control subsystem according to claim 13, wherein said programmable storage controller further comprises means for signalling that data to be written should be compressed, and means for compressing data.

15. The storage control subsystem according to claim 14, wherein said means for compressing data and said means for decompressing data comprise embedded code.

16. The storage control subsystem according to claim 14, wherein said means for compressing and said means for decompressing comprise parallel RISC processors.

17. The storage control subsystem according to claim 1, wherein said second interface comprises at least one standard high-speed parallel interface.

18. The storage control subsystem according to claim 1, wherein said programmable storage controller further comprises storage control means for receiving and translating the generic address and request information to physical target ID and data address information.

19. The storage control subsystem according to claim 17, wherein said programmable storage controller comprises means for controlling a plurality of different kinds of storage devices which comprise said storage facilities.

20. The storage control subsystem according to claim 1, wherein said programmable storage controller comprises means for accepting and executing storage related commands from host channels having a plurality of different channel languages and dialects.

21. The storage control subsystem according to claim 1, wherein said computer comprises a microcomputer.

22. The storage control subsystem according to claim 1, wherein said computer comprises a personal computer.

23. The storage control subsystem according to claim 1, wherein said computer comprises a tightly coupled multiprocessor.

24. The storage control subsystem according to claim 1, wherein said computer comprises a specialized operating system.

25. The storage control subsystem according to claim 1, wherein one of said first and second interfaces further comprises an interface to another storage controller, and further wherein the programmable storage controller comprises a communication bridge for communicating with said another storage controller.

26. The storage control subsystem according to claim 1, wherein said programmable storage controller comprises means for providing a plurality of customized controller services.

27. The storage control subsystem according to claim 26, wherein said means for providing controller services comprise at least one of: (i) a caching algorithm; and (ii) means for performing data compression and decompression.

28. The storage control subsystem according to claim 26, wherein said storage control subsystem further comprises said means for providing controller services.

29. The storage control subsystem according to claim 1, wherein said storage control subsystem further comprises said at least one host and said storage facilities.

30. The storage control subsystem according to claim 1, wherein said at least one host system comprises at least one of a mainframe computer, a mini computer, and a micro computer.

31. The storage control subsystem according to claim 2, wherein said equipment controllers comprise one or more reentrant stored programs.

32. The storage control subsystem according to claim 1, wherein said computer comprises a general purpose computer having an operating system comprising means for controlling said general purpose computer.

33. The storage control subsystem according to claim 32, wherein said operating system comprises a standard operating system.

34. A storage controlling method for transferring data between one or more channels of at least one host system and data storage facilities comprising a plurality of different types of target units, said method comprising:

operating a programmable storage controller that emulates a plurality of types of target unit specific storage controllers, said programmable storage controller being implemented with an application program and a computer, said computer being configured by said application program;

receiving a plurality of channel programs transmitted from the channels of the host system, to said programmable storage controller, each channel program carrying at least one of data, status information and commands; and interfacing said programmable storage controller with said target units; and controlling, with said programmable storage controller, exchanges of storage data to and from said target units, said controlling comprising translating said channel programs and commands from a channel specific format to a generic format of said programmable storage controller, said generic format including generic address and request information.

35. The storage controlling method according to claim 34, further comprising prioritizing input and output to and from said storage facilities.

36. The storage controlling method according to claim 34, wherein the method further comprises caching data being transmitted to and from said storage facilities.

37. The storage controlling method according to claim 34, wherein interrupt processing is executed responsive to a command received from the at least one host system, thus causing another unit thread to be executed.

38. The storage controlling method according to claim 34, wherein said one or more different types of target units comprise random access and sequential storage devices.

39. The storage controlling method according to claim 34, said method further comprising:

translating channel program commands, and determining from the channel program a target unit for which at least one channel program command is transmitted;

establishing a unit thread by choosing an equipment controlling routine from a set of equipment controlling routines which interpret data control commands and status information and control data transfer to and from storage facilities in accordance with the channel program commands, each equipment controlling routine being chosen as a function of the type of equipment that the channel program requests as a target;

passing channel program data to the unit thread; and executing the unit thread by executing the chosen equipment controlling routine; and said method, during execution of said equipment controlling routine, performing storage control management.

40. The storage controlling method according to claim 39, wherein, during execution of said equipment controlling routine, data is transferred to and from at least one of random access and sequential storage devices.

41. The storage controlling method according to claim 40, wherein the data is transferred to and from a random access storage device which comprises a removable direct access storage device, and further wherein the at least one host system comprises a mainframe computer.

42. The storage controlling method according to claim 39, wherein the type of equipment for which the host system is configured is different than said one or more different types of target units.

43. The storage controlling method according to claim 34, wherein said controlling further comprises receiving and translating the generic address and request information to physical target ID and data address information.

44. The storage controlling method according to claim 34, wherein said computer comprises a general purpose computer having an operating system, said operating comprising controlling said general purpose computer with said operating system.

45. A storage control subsystem connected between storage controller channels of at least one host system and data storage facilities comprising a plurality of target units, said storage control subsystem comprising:

a programmable storage controller that emulates a plurality of types of target unit specific storage controllers, said programmable storage controller being implemented with a general purpose computer with a general purpose operating system supporting an application program, said general purpose computer being configured by said application program;

a first interface for interfacing a plurality of channel adapters which carry a plurality of channel programs transmitted from the channels of the host system to said programmable storage controller, each channel program having means for carrying data, status information and commands; and a second interface for interfacing said programmable storage controller to said target units;

said programmable storage controller comprising a plurality of controller emulators, said controller emulators comprising means for translating said channel programs and commands from a channel specific format to a generic format of said programmable storage controller that includes generic address and request information, to thereby facilitate data and status command exchanges with said plurality of target units.

46. The storage control subsystem according to claim 45, wherein said programmable storage controller further comprises storage control means for receiving and translating the generic address and request information to physical target ID and data address information.

47. A storage controlling method for transferring data between one or more channels of at least one host system and data storage facilities comprising a plurality of different types of target units, said method comprising:

operating a programmable storage controller that emulates a plurality of types of target unit specific storage controllers, said programmable storage controller being implemented with a general purpose computer with a general purpose operating system supporting an application program, said general purpose computer being configured by said application program;

receiving a plurality of channel programs transmitted from the channels of the host system, to said programmable storage controller, each channel program carrying at least one of data, status information and commands; and interfacing said programmable storage controller with said target units; and controlling, with said programmable storage controller, exchanges of storage data to and from said target units, said controlling comprising translating said channel programs and commands from a channel specific format to a generic format of said programmable storage controller, said generic format including generic address and request information.

48. The storage controlling method according to claim 47, wherein said controlling further comprises receiving and translating the generic address and request information to physical target ID and data address information.

* * * * *

UNITED STATES PATENT AND TRADEMARK OFFICE
CERTIFICATE OF CORRECTION

PATENT NO. : 5,530,845
DATED : June 25, 1996
INVENTOR(S) : D. HIATT et al.

It is certified that error appears in the above-indentified patent and that said Letters Patent is hereby corrected as shown below:

On the title page, item: [56], "References Cited", "U.S. PATENT DOCUMENTS"; add ----5,101,490 3/1992 Getson, Jr. et al.---, ---4,479,179 10/1984 Dinwiddie, Jr.---, ---4,987,530 1/1991 Wagner et al.---, ---4,825,406 4/1989 Bean et al.---, and ----4,896,262 1/1990 Wayama et al.---.

Signed and Sealed this

Fifteenth Day of July, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.    : 5,530,845
DATED         : June 25, 1996
INVENTOR(S)   : David M. Hiatt et al.

It is certified that error appears in the above-identified patent and that said Letters Patent is hereby corrected as shown below:

Title page,
Item [75], Inventors,
Line 1, "Klos," should be changed to -- Klos; Larry T. Jost --.
Line 2, "both" should be changed to -- all --.

Signed and Sealed this

Sixteenth Day of April, 2002

Attest:

JAMES E. ROGAN
*Attesting Officer*     *Director of the United States Patent and Trademark Office*